April 19, 1932.  A. L. RICORDEL  1,855,069
MOUNTING FOR MITRAILLEUSES
Filed Jan. 29, 1931  5 Sheets-Sheet 2
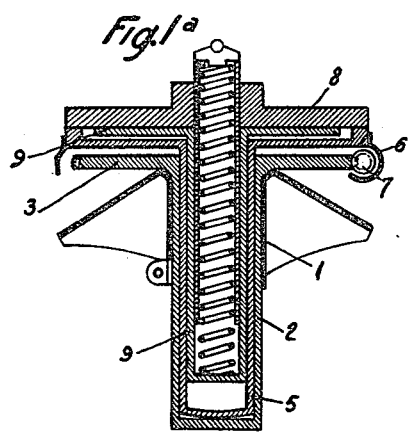
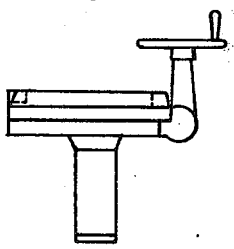
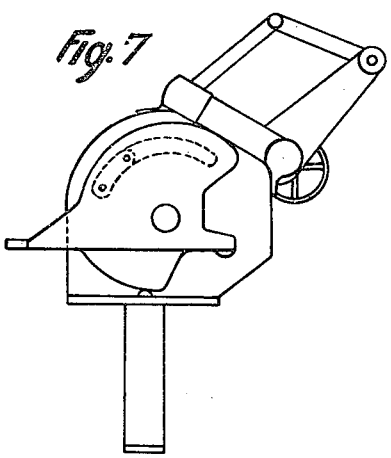
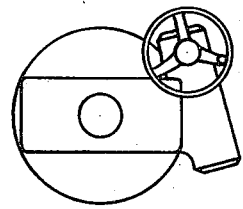
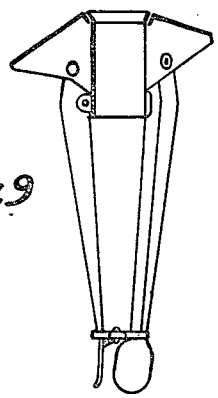
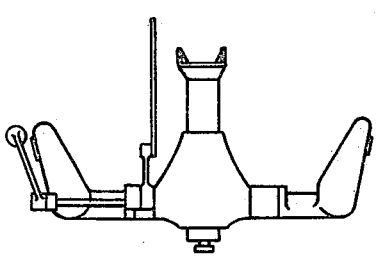
A. L. Ricordel
INVENTOR April 19, 1932. A. L. RICORDEL 1,855,069
MOUNTING FOR MITRAILLEUSES
Filed Jan. 29, 1931 5 Sheets-Sheet 3
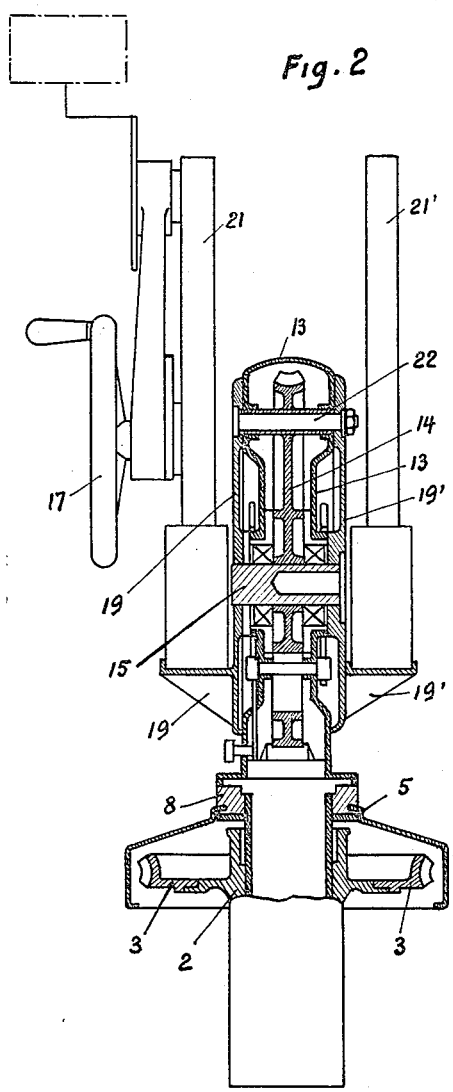
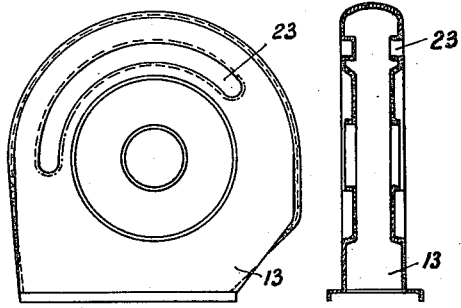
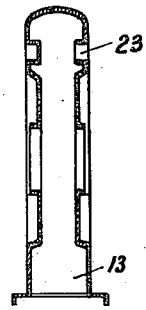
Fig. 2    Fig. 3    Fig. 4
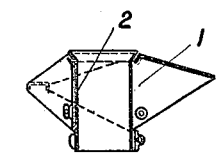
Fig. 5
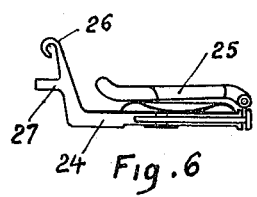
Fig. 6
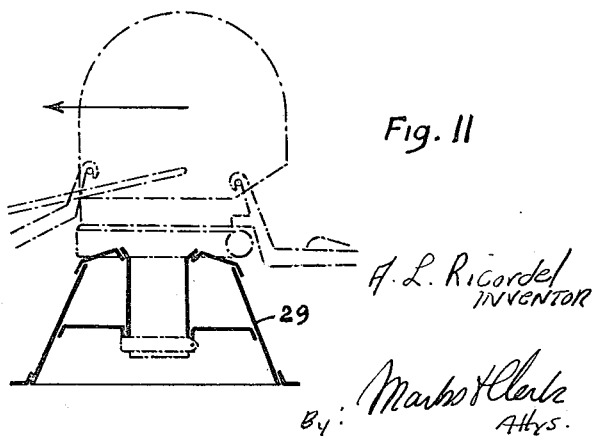
Fig. 11
A. L. Ricordel
INVENTOR
By: Marks & Clerk
Attys.

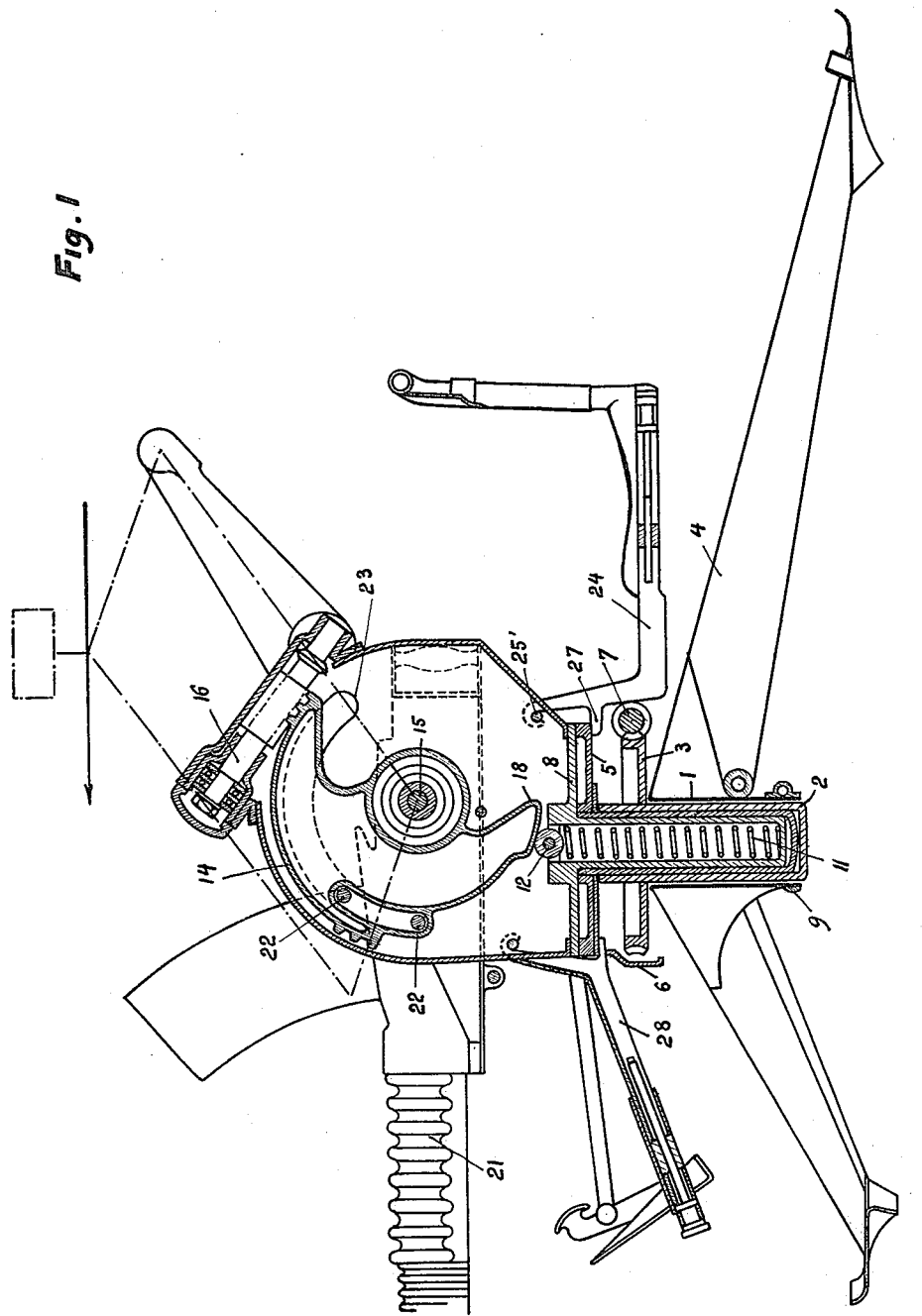

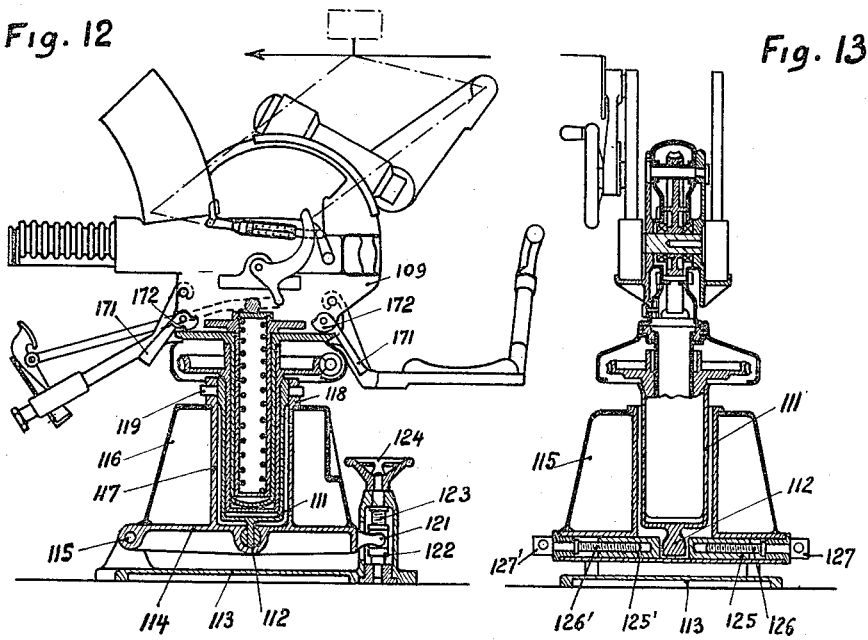
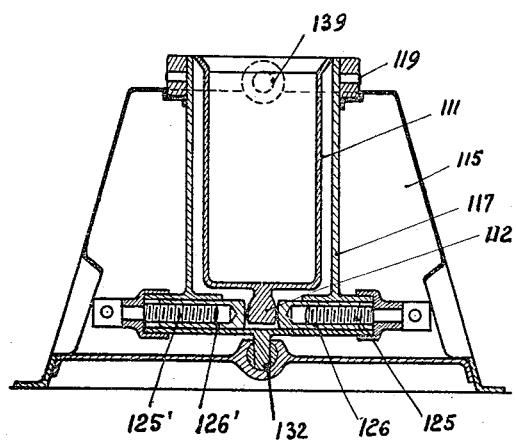
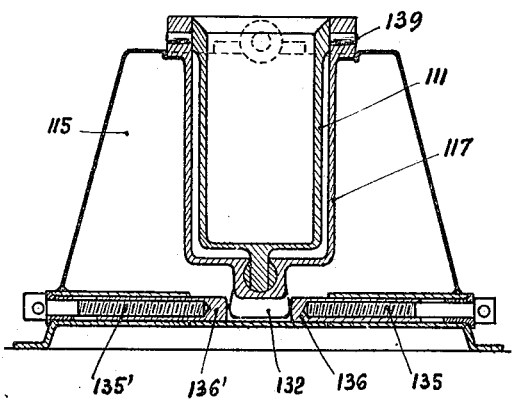

April 19, 1932.   A. L. RICORDEL   1,855,069
MOUNTING FOR MITRAILLEUSES
Filed Jan. 29, 1931   5 Sheets-Sheet 5
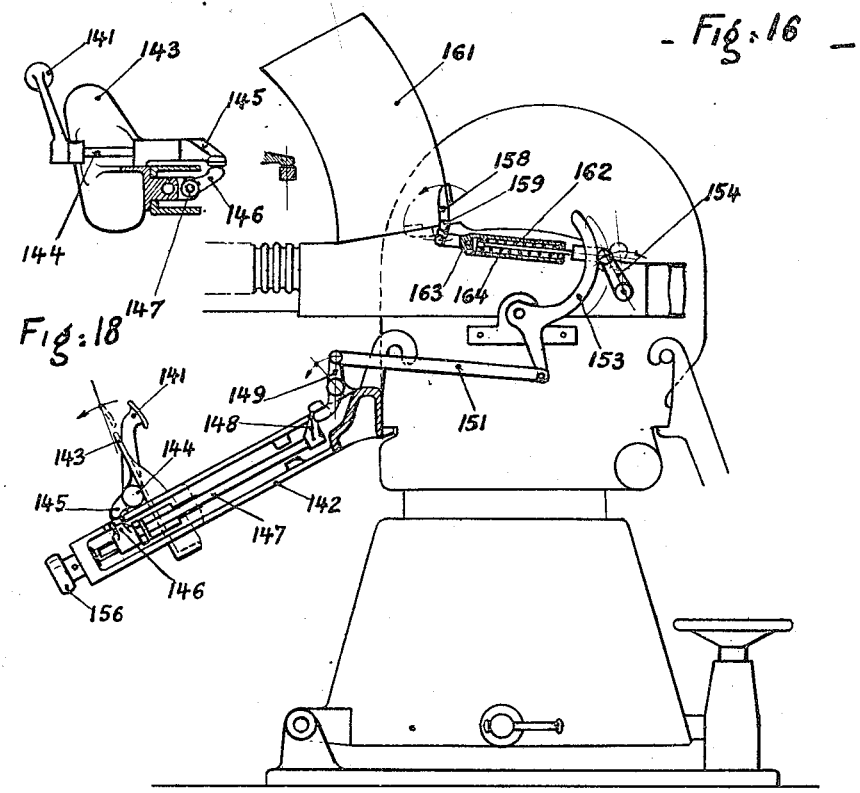
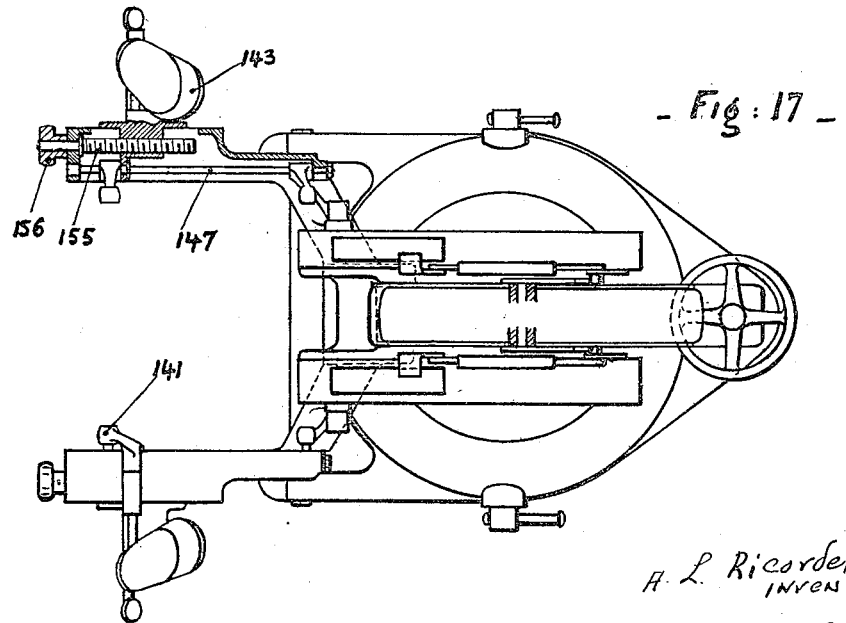

Patented Apr. 19, 1932

1,855,069

UNITED STATES PATENT OFFICE

AUGUSTE LOUIS RICORDEL, OF PARIS, FRANCE, ASSIGNOR TO LA PRECISION MODERNE, OF PARIS, FRANCE, A CORPORATION OF FRANCE

MOUNTING FOR MITRAILLEUSES

Application filed January 29, 1931, Serial No. 512,101, and in France February 11, 1930.

The present invention relates to improvements in mounting for mitrailleuses, particularly those for firing at aerial objects, such as are described in French patent specification No. 635,159 and the additions thereto. These mountings which are preferably demountable comprise essentially; a fixed foot in one or more parts, a guide support rotatable with respect to this foot and carrying with it the elevating and directing mechanism; a simple or compound cradle rotatable about a horizontal axis carried by the guide support, the cradle carrying one or more mitrailleuses and a suitable correcting means likewise carried by the guide support. In some of these mountings there is a stabilizing spring in the lower socket of the guide support, this spring co-operating with a cam which moves in accordance with the movement of the mitrailleuse in a vertical plane so as to ensure equilibrium of the mitrailleuse at whatever angle it may be fixed. According to the present invention the general construction of the mounting has been improved in that it is made possible to employ a construction of cast metal parts or a compound construction of cast parts and sheet steel thereby ensuring a more efficient protection of the mechanical parts.

With this object the guide support is provided with a flat shell formed of two halves within which a toothed sector is rotatable and is engaged by an endless screw mounted in an extension of the shell and joined to the cradle which is disposed on either side of the shell by means of bolts capable of movement in circular slots arranged in the shell.

Further the stabilizing cam against which the member subjected to the pressure of the spring acts is connected to the toothed sector.

In order to ensure a firm connection between the guide support with the rotary portion of an intermediate member termed the base which is inserted between the foot and the guide support, the seat support and the foot rest hook on the guide support are each provided with a jaw which engages under the rotary part of the base in such manner that the weight of these members together with the loads which they support act to secure the guide support to the base.

The invention further relates to various improvements directed particularly to facilitating the setting up of the mounting in cases where the surface in which it is placed is not perfectly horizontal. It is to be observed that this setting up is of the greatest importance if the mountings of this kind for use with guns for firing at aircraft are provided with precision apparatus such as correcting means.

Further improvements are concerned with the firing mechanism and are directed in the first place to enabling this to be used by persons of different heights without the necessity each time of making a fresh adjustment and in the second place to ensure safety in firing by preventing the insertion of projectiles into the gun if the firing pedal of the mounting is accidentally depressed in firing position.

Finally a further improvement facilitates the demounting of the mounting by facilitating the lifting of the head of the mounting so as to remove it from the guide support.

These various improvements are described below by way of example in their application to various embodiments of the invention. In the accompanying drawings:—

Figure 1 is a vertical sectional elevation of the assembled mounting.

Figure 1a is a detail view of part of the apparatus shown in Figure 1 on an enlarged scale.

Figure 2 is a vertical sectional elevation at right angles to that of Figure 1.

Figures 3, 4, 5, 6, 7, 8, 9, 10 show various parts of the mounting.

Figure 11 shows a type of fixed foot made of sheet metal suitable for certain cases.

Figure 12 is an axial sectional elevation of an assembled mounting having an improved setting up device.

Figure 13 is a sectional elevation at right angles to that of Figure 12.

Figures 14 and 15 represent respectively in axial section by planes corresponding to those of Figures 12 and 13 a modification of the setting up device.

Figure 16 is a side elevation and Figure 17 is a plan of the mounting showing the improvements in the firing mechanism.

Figure 18 is a detail view illustrative of the end of the support of the foot pedal of the firing mechanism, viewed in a direction perpendicular to that of Figure 16.

The foot of the mounting comprises a central portion 1 of sheet metal including a tube 2 which encloses that of the setting up device and which is provided with an annular gear 3. The tube 2 and the annular gear 3 constitutes the fixed part of the base.

The legs 4, made of channeled sheet metal provided with spades are joined to the central portion 1 by means of a bolt forming an axis of articulation. The rotary portion of the base is formed by a member 5 centered within the tube 2 and a sheet metal casing 6 an extension of which encloses the directional aiming screw 7.

The head or guide support of the cradles comprises a member 8 integral with which is the socket 9 which fits within the part 5 and which contains the stabilizing spring 11 acting on roller 12. Fixed to the member 8 is a shell 13 (see also Figures 3 and 4) consisting of two halves of stamped sheet metal welded together. Within this shell is a toothed sector 14 adapted to rotate about the axis 15 mounted in the shell.

The sector 14 is engaged directly by the endless screw 16 mounted in an extension of the shell 13. Rotation of the endless screw 16 is effected by means of the elevating wheel 17 (not shown in Figure 1 for the sake of clearness). The lower end of the sector 14 forms the stabilizing cam 18 against which the roller 12 bears.

The cradle is formed of two parts 19, 19' disposed on either side of the shell 13 and carrying for example two mitrailleuses 21, 21'. Obviously if desired a single mitrailleuse could be mounted in one part of the cradle the other part remaining empty.

Again if desired two mitrailleuses could be placed in each part of the cradle if these were suitably enlarged.

The two parts of the cradle are connected to the sector 14 by bolts such as 22 which pass through the casing and can be displaced along one or more slots such as 23. The two parts of the cradle are provided with flanges which cover the slots during the whole of the rotation.

The means for controlling the firing, correcting means etc. are for example of the type described in French specification No. 635,159. The seat support 24 to which may be secured a back support 25 is hooked on to a lug 25' carried by the shell 13 by means of a hook 26. The support is also provided with a jaw 27 which presses upwards on the plate 5 when the support 24 is in position and consequently presses the guide support against the rotary portion of the base.

The support of the foot rest 28 is constructed in a similar manner to the seat support, having a hook and a jaw operating in the same manner.

Figure 11 shows a sheet metal stand 29 which may replace the tripod 4 so as to convert the demountable stand heretofore described into a fixed stand for example for naval guns or for mounting an auto mitrailleuse.

The mounting which has just been described can be rapidly dismantled into five parts which are shown separately in Figures 6, 7, 8, 9, 10. Figure 6, already described shows the seat in folded position ready for transport. Figure 7 shows the part that has been referred to as the head or guide support of the mounting. Figure 8 shows in elevation and in plan the base with its fixed part and its rotary part, this assembly of parts comprising the wheel and endless screw for directing the gun horizontally. Figure 9 shows the foot of the mounting with its central portion and with the legs folded for transport. The parts shown in Figure 10 comprise the foot rests and the firing pedal. Each of the five parts of the dismantled mounting is sufficiently light to be carried on a man's arm which is essential for a mobile gun mounting not provided with wheels.

The mounting shown in Figure 12 likewise comprises a fixed tube 2 having a toothed wheel 3, and a rotatable part 8 carrying the head of the mounting designated by the reference 109. The fixed tube fits into a socket 111 having a projection 112 at its lower end.

At the base of the mounting is a base plate 113 bolted to the ground and a platform 114 capable of rotating on the base plate about an axis 115. The platform 114 carries a pedestal 116 preferably of conical form having a recess 117 for receiving the socket 111. Bearings 118 are integral with or fixed to the conical pedestal 116 and carry trunnions 119 fixed to the socket 111 the pivoted axis of the trunnions 119 being perpendicular to the axis 115. At the end of a diameter perpendicular to the axis 115 is an extension 121 of the platform 114 engaged by a stirrup 122 which can be raised or lowered by means of a screw 123 provided with a wheel 124. Further the projection 112 on the socket 111 engages in a slot in the platform 114, this slot being directed along a diameter parallel to the axis 115. In the slot are two sleeves 125, 125', open at one end (Figure 13) which can be advanced or retracted by means of screws 126, 126' provided with control devices 127, 127'.

The setting up is very easily effected. It is first adjusted in the plane of Figure 12 by moving the platform 114 by means of the wheel 124. It is then adjusted in the plane at right angles to this (namely the plane of Figure 13) by moving the projection 112 by the screws 126, 126' (one of which is unscrewed while the other is screwed up) by means of the sleeves 125, 125'.

The modifications of Figures 14 and 15 differs from that of Figures 12 and 13 in that it has no separate platform independent of the base plate. The entire base including the pedestal 115 is fixed. The socket 111 is suspended in the recess 117 by trunnions 119 but the recess 117 in its turn rotates about trunnions 139 perpendicular to the trunnions 119. In this way a Cardan suspension is obtained. The projection 112 of the socket 111 is moved by the screws 125, 125' and the sleeves 126, 126' (Figure 14). The recess 117 in its turn has a projection 132 which is operated by means of screws 135, 135' (Figure 15) and sleeves 136, 136' which are directed along a diameter of the base perpendicular to the former diameter.

In effect the system of Figure 13 is repeated twice.

Referring now to Figures 16, 17, 18 it will be seen that the firing is effected by means of pedal 141 mounted on a support 142 or on the support for the foot rests. According to the present invention the foot rest 143 can be displaced as well as the axis 144 of the pedal, to which it is secured, without having to alter the adjustment of the firing mechanism. For this purpose the axis 144 of the pedal carries a lever 145 which acts on a lever 146 which can slide along a square rod 147, which itself can rotate in the foot rest. By means of a lever 148, lever 149, link 151, the movement is transmitted to the cam 153 which acts on the lever 154 of the firing mechanism. The slide which carries the foot rest 143 and the axis 144 of the pedal is displaced along the support 142 by means of the screw 155 (see particularly Figure 17) controlled by the knurled knob 156.

The mounting according to the present invention includes inter alia means for preventing loading of the mitrailleuse when the pedal 141 is depressed.

This means comprises a lever 158 rotatable about an axis 159 and capable of movement into position in front of the loading channel 161 (dotted position). The other end of this lever is connected to the firing lever 154 by the link 162 sliding in the socket 163, a spring 164 being inserted between the link and the socket so as to urge the one towards the other.

When the parts are in the position shown in the figure (pedal 141 raised and charging mechanism open) it will be seen that the lever 158 does not engage the channel so that the mitrailleuse can be loaded.

When on the other hand the pedal 141 is depressed (with the parts as shown by the dotted lines) the lever 158 prevents access to the channel.

When the cartridge is in position and the pedal 141 is depressed the lever 158 presses on the cartridge which is in the channel end the cam 153 can act on the firing lever 154 owing to the extensibility of the system 162, 163 permitted by the spring 164.

Finally (Fig. 12) in order to secure the head 109 on the guide support 8, handles 171 are employed hinged to the head 109 and having enlargements 172 in the form of cams. It is clear that if the locking handles are turned upwards so as to unlock the lead 109 from the base 8 of the guide support the head 109 is lifted from the base 8 owing to the enlargements 172, thereby facilitating the dismantling of the mounting.

I claim,

1. Mounting for mitrailleuses particularly those for firing at aerial objects comprising a foot, a guide support adapted to rotate on this foot about a vertical axis, a shell fixed on the guide support, a toothed sector mounted freely on a horizontal axis mounted in the shell, two cradles for carrying mitrailleuses located on either side of the shell and rigidly connected to the toothed sector, a stabilizing means, an endless screw mounted in an extension of the shell and engaging with the toothed sector, and means for accurately setting up the mounting if the surface of the base plate is not absolutely horizontal.

2. Mounting for mitrailleuses, particularly those for firing at aerial objects, comprising a foot, a guide support adapted to rotate on the foot about a vertical axis, a shell secured to the guide support, a toothed sector freely mounted on a horizontal axis mounted in the shell, two cradles for carrying mitrailleuses located on either side of the shell so as to be rotatable freely about the horizontal axis of rotation of the toothed sector, stabilizing means, connecting bolts between the toothed sector and the cradles, the said bolts passing through corresponding apertures in the shell, an endless screw located in an extension of the shell and engaging with the toothed sector and means for accurately setting up the mounting if the surface of the base plate is not perfectly horizontal.

3. Mounting for mitrailleuses particularly for firing at aerial objects, comprising a foot, a guide support adapted to rotate on the foot about a vertical axis, a shell secured to the guide support, a toothed sector freely mounted on a horizontal axis mounted in the shell, two cradles for carrying mitrailleuses located one on each side of the shell so as to be freely rotatable about the axis of rotation of the toothed sector, bolts connecting the toothed sector and the cradles the said bolts passing through corresponding apertures in the shell, an endless screw located in an extension of the shell and engaging with the toothed sector, stabilizing means comprising a stabilizing spring provided with means maintained under pressure by the said spring against a stabilizing cam rigidly connected to the toothed sector, and means enabling the mounting to be set up absolutely correctly if the surface of the base plate is not perfectly horizontal.

4. Mounting for mitrailleuses particularly those for firing at aerial objects, comprising a foot, a guide support adapted to rotate on the foot about a vertical axis, a shell secured to the guide support, a seat support and a foot rest support each having a hook which hooks on to a lug on the shell and each having a jaw which engages with the rotary portion of the base so as to press the base and the shell together, a toothed sector freely mounted on a horizontal axis mounted in the shell, two cradles for carrying mitrailleuses located one on each side of the shell in rigid connection with the toothed sector, stabilizing means, an endless screw mounted in an extension of the shell and engaging with the toothed sector and means enabling correct setting up of the mounting if the surface of the base plate is not perfectly horizontal.

5. Mounting for mitrailleuses particularly for firing at aerial objects, comprising a foot, a guide support rotatable on the foot about a vertical axis, a shell secured to the guide support, a toothed sector freely mounted on a horizontal axis mounted in the shell, two cradles for carrying mitrailleuses located on either side of the shell and rigidly connected to the toothed sector, stabilizing means, an endless screw disposed in an extension of the shell and engaging with the toothed sector, a cylindrical socket containing the cylindrical foot of the guide support and suspended by trunnions in adjustable manner in a secondary support, means for suspending the secondary support in the fixed support by means of trunnions having their axis perpendicular to that of the first mentioned trunnions.

In testimony whereof I have affixed my signature.

AUGUSTE LOUIS RICORDEL.